United States Patent
Osby et al.

(10) Patent No.: US 9,388,260 B2
(45) Date of Patent: Jul. 12, 2016

(54) ETHYLENE-BASED POLYMERS WITH IMPROVED MELT STRENGTH AND PROCESSES FOR THE SAME

(71) Applicants: John O. Osby, Lake Jackson, TX (US); Sean W. Ewart, Pearland, TX (US)

(72) Inventors: John O. Osby, Lake Jackson, TX (US); Sean W. Ewart, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 43 days.

(21) Appl. No.: 14/367,849

(22) PCT Filed: Dec. 10, 2012

(86) PCT No.: PCT/US2012/068727
§ 371 (c)(1),
(2) Date: Jun. 20, 2014

(87) PCT Pub. No.: WO2013/095969
PCT Pub. Date: Jun. 27, 2013

(65) Prior Publication Data
US 2015/0344599 A1 Dec. 3, 2015

Related U.S. Application Data

(60) Provisional application No. 61/579,067, filed on Dec. 22, 2011.

(51) Int. Cl.
C08F 210/02 (2006.01)
C08F 2/38 (2006.01)
C08F 220/20 (2006.01)

(52) U.S. Cl.
CPC .................. *C08F 210/02* (2013.01)

(58) Field of Classification Search
CPC ..... C08F 2/38; C08F 210/02; C08F 2220/283
USPC .......................... 524/558; 526/64, 323, 323.2
See application file for complete search history.

(56) References Cited

U.S. PATENT DOCUMENTS

| | | | |
|---|---|---|---|
| 5,539,075 A | | 7/1996 | Gustafsson et al. |
| 5,569,703 A | * | 10/1996 | Yoshii .................. C09J 131/04 156/327 |
| 2008/0242809 A1 | | 10/2008 | Neuteboom et al. |

FOREIGN PATENT DOCUMENTS

| EP | 1650232 A1 | 4/2006 |
|---|---|---|
| WO | 97/45465 A1 | 12/1997 |
| WO | 2007/110127 A1 | 10/2007 |
| WO | 2010/057975 A2 | 5/2010 |
| WO | 2012/057975 A1 | 5/2012 |

OTHER PUBLICATIONS

Tung, L.H., et al., Preparation of Polystyrene with Long Chain Branches via Free Radical Polymerization, J. Polym. Sci., Polym. Chem. Ed., (1981), 19, 2027-39.
Tung, L.H., Branching Kinetics in Copolymerization of Styrene with a Chain-Transfer Monomer, J. Polym. Sci., Polym. Chem. Ed., (1981), 19, 3209-3217.
Liu, J., et al., Branched Polymer via Free Radical Polymerization of Chain Transfer Monomer: A Theoretical and Experimental Investigation, J. Polym. Sci. Part A: Polym. Chem., (2007), 46, 1449-59.
PCT/US2012/068727, International Search Report dated Feb. 14, 2013.
PCT/ US2012/068727, International Preliminary Report on Patentability dated Jun. 24, 2014.
PCT/ US2012/068727, Written Opinion of the International Searching Authority dated Feb. 21, 2013.

* cited by examiner

*Primary Examiner* — Fred M Teskin

(57) ABSTRACT

The invention provides an ethylene-based polymer formed from at least the following: ethylene and a monomeric chain transfer agent (monomeric CTA) selected from Structure 1: wherein L is selected from a saturated hydrocarbon, a substituted saturated hydrocarbon, an unsaturated hydrocarbon, or a substituted unsaturated hydrocarbon; R1 is selected from hydrogen, a saturated hydrocarbon, a substituted saturated hydrocarbon, an unsaturated hydrocarbon, or a substituted unsaturated hydrocarbon; R2 is selected from hydrogen, a saturated hydrocarbon or a substituted saturated hydrocarbon; R3 is selected from hydrogen, a saturated hydrocarbon or a substituted saturated hydrocarbon; and R4 is selected from a saturated hydrocarbon, a substituted saturated hydrocarbon, an unsaturated hydrocarbon, or a substituted unsaturated hydrocarbon.

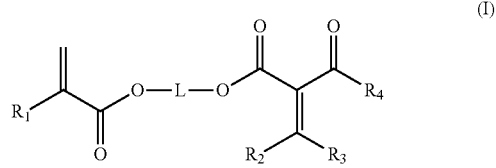

(I)

15 Claims, No Drawings

ETHYLENE-BASED POLYMERS WITH IMPROVED MELT STRENGTH AND PROCESSES FOR THE SAME

REFERENCE TO RELATED APPLICATIONS

The present application claims the benefit of U.S. Provisional Application No. 61/579,067, filed Dec. 22, 2011.

BACKGROUND

Conventional low density polyethylene (LDPE) has good processability, however, when used in film or extrusion coating applications, increased melt strength is still desired.

U.S. Publication No. 2008/0242809 discloses a process for the preparation of a copolymer of ethylene and a comonomer, and where the polymerization takes place in a tubular reactor, at a peak temperature between 290° C. and 350° C. The comonomer is a di- or higher functional (meth)acrylate, and the co monomer is used in an amount between 0.008 mole percent and 0.200 mole percent, relative to the amount of ethylene copolymer.

International Publication No. WO 2007/110127 discloses an extrusion coating composition comprising an ethylene copolymer. The ethylene copolymer is obtained by a polymerization process in a tubular reactor, at a peak temperature between 300° C. and 350° C., and the comonomer is a bifunctional α,ω-alkadiene.

U.S. Pat. No. 5,539,075 discloses the polymerization of ethylene and at least one monomer, which is copolymerizable with ethylene, and includes a polyunsaturated comonomer having a chain of at least eight carbon atoms and at least two non-conjugated double bonds, of which at least one is terminal. The polymerization takes place at a pressure of about 100-300 MPa, and a temperature of about 80°-300° C., under the action of a radical initiator. The polyunsaturated comonomer preferably is an α,ω-alkadiene having 8-16 carbon atoms, and most preferred 1,9-decadiene. Apart from the polyunsaturated comonomer, the polymerization may also involve another vinyl-unsaturated monomer, preferably containing at least one functional group selected from hydroxyl groups, alkoxy groups, carbonyl groups, carboxyl groups and ester groups. The ethylene copolymers produced have an increased degree of unsaturation, which can be used for cross-linking the ethylene copolymer or grafting reactive groups.

International Publication No. WO 97/45465 discloses an unsaturated ethylene copolymer, a method for producing it, and its use for producing cross-linked structures. The unsaturated ethylene copolymer comprises a polymer obtained by radical polymerization, through a high-pressure process of ethylene and at least one monomer, which is copolymerizable with ethylene, and includes a diunsaturated comonomer of the formula (I): H2C=CH—O—R—CH=CH2, wherein R=—(CH2)m-O—, —(CH2CH2O)n—, or —CH2-C6H10-CH2-O—, m=2-10, and n=1-5. Preferably, the comonomer of formula (I) is 1,4-butanediol divinyl ether.

Tung, L. H., et al., *Preparation of Polystyrene with Long Chain Branches via Free Radical Polymerization*, J. Polym. Sci., Polym. Chem. Ed., (1981), 19, 2027-39, discloses the use of small amounts of chain-transferring monomers to copolymerize with styrene, free-radically. Of the comonomers examined, vinylbenzylthiol, yielded polystyrene with a branched structure. The branches are disclosed as occurring mainly in the low molecular weight end of the distribution. Vinylbenzylthiol was also found to be an effective agent for the broadening of the molecular weight distribution.

Tung, L. H., *Branching Kinetics in Copolymerization of Styrene with a Chain-Transfer Monomer*, J. Polym. Sci., Polym. Chem. Ed., (1981), 19, 3209-3217, discloses the use of polymerization kinetics to compute the theoretical molecular weight and degree of branching for the polymerization with styrene with a chain transfer monomer (for example, vinylbenzylthiol).

Liu, J., et al., *Branched Polymer via Free Radical Polymerization of Chain Transfer Monomer: A Theoretical and Experimental Investigation*, J. Polym. Sci. Part A: Polym. Chem., (2007), 46, 1449-59, discloses a mathematical model for the free radical polymerization of chain transfer monomers containing both polymerizable vinyl groups and telogen groups. The molecular architecture of the polymer is disclosed as being prognosticated according to the developed model, which was validated experimentally by the homopolymerization of 4-vinyl benzyl thiol (VBT), and its copolymerization with styrene.

Other polymerizations are disclosed in WO 2012/057975. However, as discussed, there remains a need for ethylene-based polymers, such as low density polyethylene (LDPE), with improved melt strength, especially for film and extrusion coating applications. These needs and others have been met by the following invention.

SUMMARY OF THE INVENTION

The invention provides an ethylene-based polymer formed from at least the following: ethylene and a monomeric chain transfer agent (monomeric CTA) selected from Structure 1:

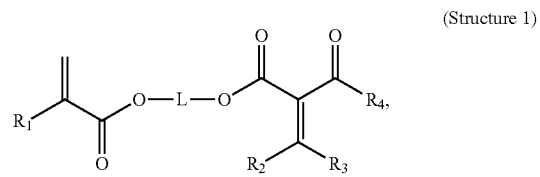

(Structure 1)

wherein

L is selected from a saturated hydrocarbon, a substituted saturated hydrocarbon, an unsaturated hydrocarbon, or a substituted unsaturated hydrocarbon;

R1 is selected from hydrogen, a saturated hydrocarbon, a substituted saturated hydrocarbon, an unsaturated hydrocarbon, or a substituted unsaturated hydrocarbon;

R2 is selected from hydrogen, a saturated hydrocarbon or a substituted saturated hydrocarbon;

R3 is selected from hydrogen, a saturated hydrocarbon or a substituted saturated hydrocarbon; and R4 is selected from a saturated hydrocarbon, a substituted saturated hydrocarbon, an unsaturated hydrocarbon, or a substituted unsaturated hydrocarbon.

DETAILED DESCRIPTION

As discussed above, the invention provides an ethylene-based polymer formed from at least the following: ethylene and a monomeric chain transfer agent (monomeric CTA) selected from Structure 1:

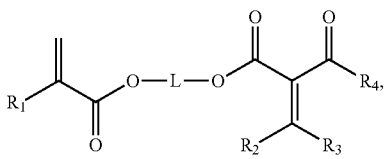

(Structure 1)

wherein

L is selected from a saturated hydrocarbon, a substituted saturated hydrocarbon, an unsaturated hydrocarbon, or a substituted unsaturated hydrocarbon;

R1 is selected from hydrogen, a saturated hydrocarbon, a substituted saturated hydrocarbon, an unsaturated hydrocarbon, or a substituted unsaturated hydrocarbon;

R2 is selected from hydrogen, a saturated hydrocarbon or a substituted saturated hydrocarbon;

R3 is selected from hydrogen, a saturated hydrocarbon or a substituted saturated hydrocarbon; and R4 is selected from a saturated hydrocarbon, a substituted saturated hydrocarbon, an unsaturated hydrocarbon, or a substituted unsaturated hydrocarbon.

The ethylene-based polymer may comprise a combination of two or more embodiments as described herein.

In one embodiment, L is selected from a saturated hydrocarbon or a substituted saturated hydrocarbon.

In one embodiment, L (or -L-) is selected from the group consisting of the following:
a) —$(CH_2)_n$—, where $n \geq 2$;
b) —$(CH_2CH_2O)_n$—$CH_2CH_2$—, where $n \geq 1$;
c) —$(CH_2CH(CH_3)O)_n$—$CH_2CH(CH_3)$—, where $n \geq 1$;
d) —$(CH_2CH(CH_2CH_3)O)_n$—$CH_2CH(CH_2CH_3)$—, where $n \geq 1$;
e) —$CH_2$—$CH(OH)$—$CH_2$—;
f) —$CH(CH_3)$—$CH_2$—;
g) —$CH_2$—$CH(CH_3)$—;
h) a combination of —$CH(CH_3)$—$CH_2$— and —$CH_2$—$CH(CH_3)$—;
i) —$CH(CH_2CH_3)$—$CH_2$—;
j) —$CH_2$—$CH(CH_2CH_3)$—; and
k) a combination of —$CH(CH_2CH_3)$—$CH_2$— and —$CH_2$—$CH(CH_2CH_3)$—.

In one embodiment, L is selected from the group consisting of the following:
a) —$(CH_2)_n$—, where $n \geq 2$;
b) —$(CH_2CH_2O)_n$—$CH_2CH_2$—, where $n \geq 1$;
c) —$(CH_2CH(CH_3)O)_n$—$CH_2CH(CH_3)$—, where $n \geq 1$;
d) —$(CH_2CH(CH_2CH_3)O)_n$—$CH_2CH(CH_2CH_3)$—, where $n \geq 1$; and
e) —$CH_2$—$CH(OH)$—$CH_2$—.

In one embodiment, L (or -L-) is an alkylene comprising at least two carbon atoms. In a further embodiment, L is selected from —$CH_2CH_2$—, —$CH_2CH_2CH_2$—, —$CH(CH_3)$—$CH_2$—, —$CH_2$—$CH(CH_3)$—, —$CH_2CH_2CH_2CH_2$—, —$CH_2$—$C(CH_3)_2$—$CH_2$—.

In one embodiment, R1 is selected from hydrogen, a saturated hydrocarbon, or a substituted saturated hydrocarbon.

In one embodiment, R1 is selected from a saturated hydrocarbon or a substituted saturated hydrocarbon.

In one embodiment, R1 is selected from hydrogen, or a substituted saturated hydrocarbon.

In one embodiment, R1 is selected from hydrogen, or a saturated hydrocarbon.

In one embodiment, R1 is selected from hydrogen, or an alkyl group.

In one embodiment, R2 is hydrogen or a saturated hydrocarbon. In a further embodiment, R2 is hydrogen. In another embodiment, R2 is a saturated hydrocarbon.

In one embodiment, R2 is hydrogen or an alkyl group. In a further embodiment, R2 is selected from methyl, ethyl, propyl, butyl, pentyl, hexyl, or cyclohexyl.

In one embodiment, R2 is selected from $C_nH_{2n+1}$, where $n \geq 1$. In a further embodiment, n is from 1 to 20, further n is from 1 to 10, and further n is from 1 to 6.

In one embodiment, R3 is hydrogen or a saturated hydrocarbon. In a further embodiment, R3 is hydrogen. In another embodiment, R3 is a saturated hydrocarbon.

In one embodiment, R3 is hydrogen or an alkyl group. In a further embodiment, R3 is selected from methyl, ethyl, propyl, butyl, pentyl, hexyl, or cyclohexyl.

In one embodiment, R3 is selected from $C_nH_{2n+1}$, where $n \geq 1$. In a further embodiment, n is from 1 to 20, further n is from 1 to 10, and further n is from 1 to 6.

In one embodiment, R4 is selected from a saturated hydrocarbon or a substituted saturated hydrocarbon.

In one embodiment, R4 is selected from a saturated hydrocarbon.

In one embodiment, R4 is an alkyl. In a further embodiment, R4 is selected from methyl, ethyl, propyl, butyl, pentyl, hexyl, or cyclohexyl.

In one embodiment, R4 is selected from the group consisting of the following: $C_nH_{2n+1}$, where $n \geq 1$. In a further embodiment, n is from 1 to 20, further n is from 1 to 10, further n is from 1 to 6.

In one embodiment, the ethylene-based polymer comprises, in reacted form, at least 0.050 moles of the monomeric CTA per 1000 moles of ethylene-based polymer backbone carbons, based on the weight of the polymer.

In one embodiment, the ethylene-based polymer comprises, in reacted form, less than, or equal to, 10 moles monomeric CTA per 1000 moles of ethylene-based polymer backbone carbons, based on the weight of the polymer.

In one embodiment, the ethylene-based polymer comprises, in reacted form, less than, or equal to, 5 moles monomeric CTA per 1000 moles of ethylene-based polymer backbone carbons, based on the weight of the polymer.

In one embodiment, the ethylene-based polymer comprises, in reacted form, at least 0.03 wt % of the monomeric CTA, based on the weight of the polymer.

In one embodiment the ethylene-based polymer has a melt index (I2) from 0.01 to 1000, typically from 0.05 to 100, and more typically from 0.1 to 50, grams per 10 minutes (g/10 min).

In one embodiment, the ethylene-based polymer has a melt index (I2) from 0.3 to 100 g/10 min, or from 1 to 50 g/10 min, or from 2 to 20 g/10 min.

In one embodiment the ethylene-based polymer has a density greater than, or equal to, 0.91, or greater than, or equal to, 0.92, or greater than, or equal to, 0.93, grams per cubic centimeter (g/cc or g/cm$^3$).

In one embodiment the ethylene-based polymer has a density less than, or equal to, 0.96, or less than, or equal to, 0.95, or less than, or equal to, 0.94, grams per cubic centimeter (g/cc or g/cm$^3$).

In one embodiment the ethylene-based polymer has a density from 0.91 to 0.96 g/cc, or from 0.91 to 0.95 g/cc, or from 0.91 to 0.94 g/cc.

The invention also provides a composition comprising an inventive ethylene-based polymer, as described herein.

In one embodiment, the composition further comprises another ethylene/α-olefin interpolymer with a density less than, or equal to, 0.94 g/cc.

In one embodiment, the composition further comprises another ethylene-based polymer that differs from the inventive ethylene-based polymer in one or more properties, for example, density, melt index (I2), Mw, Mn or Mw/Mn.

The invention also provides an article comprising at least one component formed from an inventive composition as described herein.

In one embodiment, the article is a film or a coating (for example, an extrusion coating).

In one embodiment, the article is a film.

In one embodiment, the article is a coating. In a further embodiment, the article is an extrusion coating.

An inventive ethylene-based polymer may comprise a combination of two or more embodiments as described herein.

An inventive composition may comprise a combination of two or more embodiments as described herein.

An inventive article may comprise a combination of two or more embodiments as described herein.

The invention also provides a process to form an inventive ethylene-based polymer, as described herein, the process comprising polymerizing ethylene in the presence of the monomeric chain transfer agent (monomeric CTA) of Structure 1. In a further embodiment, the process further comprises polymerizing ethylene in the presence of at least one free-radical initiator and the monomeric chain transfer agent (monomeric CTA) of Structure 1. In a further embodiment, the process further comprises polymerizing ethylene in the presence of the at least one free-radical initiator and at least two monomeric chain transfer agents (monomeric CTAs) of Structure 1.

In one embodiment, the ethylene is polymerized in the presence of at least 20 mole ppm (based on amount of total monomers in reaction feed) of the monomeric chain transfer agent (monomeric CTA).

In one embodiment, the polymerization pressure is greater than, or equal to, 100 MPa.

In one embodiment, the polymerization takes place in at least one tubular reactor or at least one autoclave.

In one embodiment, the polymerization takes place in at least one autoclave. In one embodiment, the polymerization takes place in at least one tubular reactor. In a further embodiment, the polymerization takes place at at least one pressure from 150 MPa to 350 MPa. In a further embodiment, the polymerization takes place at at least one temperature from 100° C. to 380° C.

In one embodiment, the monomeric chain transfer agent is added to the polymerization in an amount from 0.0020 to 0.3000 mole percent, based on the total moles of ethylene and monomeric CTA added to the polymerization. In a further embodiment, the polymerization takes place in two reactors. In another embodiment, the polymerization takes place in one reactor.

An inventive process may comprise a combination of two or more embodiments as described herein.

Inventive ethylene-based polymers have been discovered, and which are prepared from at least the following: ethylene and a monomeric chain transfer agent, as described herein. The monomeric chain transfer agent preferably has a carbon-carbon double bond on one end of the molecule and a chemical functional group capable of reactive chain transfer on the other end. The inventive polymers have improved (higher) melt strength as compared to conventional LDPE.

Process

For producing a highly branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

In one embodiment, an initiator is injected prior to the reaction zone where free radical polymerization is to be induced.

Often a conventional chain transfer agent is used to control molecular weight. In a preferred embodiment, one or more conventional chain transfer agents (CTAs) are added to an inventive polymerization process. Typical CTA that can be used include, but are not limited to, propylene, isobutane, n-butane, 1-butene, methyl ethyl ketone, acetone, ethyl acetate, propionaldehyde, ISOPAR (ExxonMobil Chemical Co.), and isopropanol. In one embodiment, the amount of CTA used in the process is from 0.03 to 10 weight percent of the total reaction mixture. The process may also use a distribution of fresh ethylene, a distribution of recycle ethylene and/or a distribution of CTA; for example, see the following patent references: International Applications Nos. PCT/US12/059469, PCT/US12/064284, PCT/US12/066102, and International Publication Nos. WO 2012/044504, WO 2011/075465 and WO 2012/044503 (each application and publication is incorporated herein by reference).

In one embodiment the process may include a process recycle loop to improve conversion efficiency.

Ethylene used for the production of ethylene-based polymer may be purified ethylene, which is obtained by removing polar components from a loop recycle stream, or by using a reaction system configuration, such that only fresh ethylene is used for making the inventive polymer. It is not typical that purified ethylene is required to make ethylene-based polymer. In such cases ethylene from the recycle loop may be used.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In one embodiment, the ethylene-based polymer comprises ethylene and at least one monomeric CTA as the only monomeric units.

Monomeric Chain Transfer Agents

A monomeric CTA (mCTA) is a comonomer, wherein one end of the comonomer can incorporate (or react) by copolymerization, and another portion of the comonomer can incorporate (or react completely, or in part) by chain transfer. However, some compounds may not react, or may react only minimally by chain transfer.

The monomeric chain transfer agent (monomeric CTA) is selected from Structure 1:

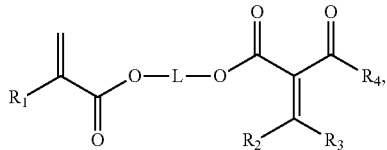
(Structure 1)

wherein

L is selected from a saturated hydrocarbon, a substituted saturated hydrocarbon, an unsaturated hydrocarbon, or a substituted unsaturated hydrocarbon;

R1 is selected from hydrogen, a saturated hydrocarbon, a substituted saturated hydrocarbon, an unsaturated hydrocarbon, or a substituted unsaturated hydrocarbon;

R2 is selected from hydrogen, a saturated hydrocarbon or a substituted saturated hydrocarbon;

R3 is selected from hydrogen, a saturated hydrocarbon or a substituted saturated hydrocarbon; and R4 is selected from a saturated hydrocarbon, a substituted saturated hydrocarbon, an unsaturated hydrocarbon, or a substituted unsaturated hydrocarbon.

A monomeric chain transfer agent may comprise a combination of two or more embodiments as described herein.

In one embodiment, L is selected from a saturated hydrocarbon or a substituted saturated hydrocarbon.

In one embodiment, L (or -L-) is selected from the group consisting of the following:
 a) $-(CH_2)_n-$, where $n \geq 2$;
 b) $-(CH_2CH_2O)_n-CH_2CH_2-$, where $n \geq 1$;
 c) $-(CH_2CH(CH_3)O)_n-CH_2CH(CH_3)-$, where $n \geq 1$;
 d) $-(CH_2CH(CH_2CH_3)O)_n-CH_2CH(CH_2CH_3)-$, where $n \geq 1$;
 e) $-CH_2-CH(OH)-CH_2-$;
 f) $-CH(CH_3)-CH_2-$;
 g) $-CH_2-CH(CH_3)-$;
 h) a combination of $-CH(CH_3)-CH_2-$ and $-CH_2-CH(CH_3)-$;
 i) $-CH(CH_2CH_3)-CH_2-$;
 j) $-CH_2-CH(CH_2CH_3)-$; and
 k) a combination of $-CH(CH_2CH_3)-CH_2-$ and $-CH_2-CH(CH_2CH_3)-$.

In one embodiment, L is selected from the group consisting of the following:
 a) $-(CH_2)_n-$, where $n \geq 2$;
 b) $-(CH_2CH_2O)_n-CH_2CH_2-$, where $n \geq 1$;
 c) $-(CH_2CH(CH_3)O)_n-CH_2CH(CH_3)-$, where $n \geq 1$;
 d) $-(CH_2CH(CH_2CH_3)O)_n-CH_2CH(CH_2CH_3)-$, where $n \geq 1$; and
 e) $-CH_2-CH(OH)-CH_2-$.

In one embodiment, L (or -L-) is an alkylene comprising at least two carbon atoms. In a further embodiment, L is selected from $-CH_2CH_2-$, $-CH_2CH_2CH_2-$, $-CH(CH_3)-CH_2-$, $-CH_2-CH(CH_3)-$, $-CH_2CH_2CH_2CH_2-$, $-CH_2-C(CH_3)_2-CH_2-$.

In one embodiment, R1 is selected from hydrogen, a saturated hydrocarbon, or a substituted saturated hydrocarbon.

In one embodiment, R1 is selected from a saturated hydrocarbon or a substituted saturated hydrocarbon.

In one embodiment, R1 is selected from hydrogen, or a substituted saturated hydrocarbon.

In one embodiment, R1 is selected from hydrogen, or a saturated hydrocarbon.

In one embodiment, R1 is selected from hydrogen, or an alkyl group.

In one embodiment, R1 is hydrogen.

In one embodiment, R1 is an alkyl. In a further embodiment, R1 is selected from methyl, ethyl, propyl, butyl, pentyl, hexyl, or cyclohexyl, and further methyl, ethyl, or propyl.

In one embodiment, R1 (or —R1) is selected from the following: H or $-(C_nH_{2n+1})$, where $n \geq 1$. In a further embodiment, n is from 1 to 20, further n is from 1 to 10, further n is from 1 to 6, and further n is from 1 to 3.

In one embodiment, R1 (or —R1) is selected from the group consisting of the following: $-(C_nH_{2n+1})$, where $n \geq 1$. In a further embodiment, n is from 1 to 20, further n is from 1 to 10, further n is from 1 to 6, and further n is from 1 to 3.

In one embodiment, R2 is selected from hydrogen, a saturated hydrocarbon or a substituted saturated hydrocarbon.

In one embodiment, R2 is selected from a saturated hydrocarbon or a substituted saturated hydrocarbon.

In one embodiment, R2 is selected from hydrogen or a substituted saturated hydrocarbon.

In one embodiment, R2 is selected from hydrogen or a saturated hydrocarbon.

In one embodiment, R2 is selected from hydrogen or an alkyl.

In one embodiment, R2 is hydrogen.

In one embodiment, R2 is an alkyl. In a further embodiment, R2 is selected from methyl, ethyl, propyl, butyl, pentyl, hexyl, or cyclohexyl, and further methyl, ethyl, or propyl.

In one embodiment, R2 (or —R2) is selected from the following: H or $-(C_nH_{2n+1})$, where $n \geq 1$. In a further embodiment, n is from 1 to 20, further n is from 1 to 10, further n is from 1 to 6, and further n is from 1 to 3.

In one embodiment, R2 (or —R2) is selected from the following: $-(C_nH_{2n+1})$, where $n \geq 1$. In a further embodiment, n is from 1 to 20, further n is from 1 to 10, further n is from 1 to 6, and further n is from 1 to 3.

In one embodiment, R3 is selected from hydrogen, a saturated hydrocarbon or a substituted saturated hydrocarbon.

In one embodiment, R3 is selected from a saturated hydrocarbon or a substituted saturated hydrocarbon.

In one embodiment, R3 is selected from hydrogen or a substituted saturated hydrocarbon.

In one embodiment, R3 is selected from hydrogen or a saturated hydrocarbon.

In one embodiment, R3 is selected from hydrogen or an alkyl.

In one embodiment, R3 is hydrogen.

In one embodiment, R3 is an alkyl. In a further embodiment, R2 is selected from methyl, ethyl, propyl, butyl, pentyl, hexyl, or cyclohexyl, and further methyl, ethyl, or propyl.

In one embodiment, R3 (or —R3) is selected from the following: H or $-(C_nH_{2n+1})$, where $n \geq 1$. In a further embodiment, n is from 1 to 20, further n is from 1 to 10, further n is from 1 to 6, and further n is from 1 to 3.

In one embodiment, R3 (or —R3) is selected from the following: $-(C_nH_{2n+1})$, where $n \geq 1$. In a further embodiment, n is from 1 to 20, further n is from 1 to 10, further n is from 1 to 6, and further n is from 1 to 3.

In one embodiment, R4 is selected from a saturated hydrocarbon or a substituted saturated hydrocarbon.

In one embodiment, R4 is selected from a substituted saturated hydrocarbon.

In one embodiment, R4 is selected from a saturated hydrocarbon.

In one embodiment, R4 is an alkyl. In a further embodiment, R4 is selected from methyl, ethyl, propyl, butyl, pentyl, hexyl, or cyclohexyl, and further methyl, ethyl, or propyl.

In one embodiment, R4 (or —R4) is selected from the group consisting of the following: —($C_nH_{2n+1}$), where n≥1. In a further embodiment, n is from 1 to 20, further n is from 1 to 10, further n is from 1 to 6, and further n is from 1 to 3.

In one embodiment, R2 and R3 form a ring structure. In a further embodiment, R2 and R3 form a C5-C8 ring. In a further embodiment, R2 and R3 form a C5-C6 ring structure.

In one embodiment, R2, R3 and R4 form a ring structure. In a further embodiment, R2 and R3 form a C8-C10 ring.

As seen in noted structures, the notation "∼∼∼" represents a mixture of the (E) and (Z) isomers. For example, see March, J., *Advanced Organic Chemistry*, 3rd Ed., John Wiley & Sons, Inc., 1985, pp. 109-110.

In one embodiment, the monomeric chain transfer agent is selected from the group consisting of the following:

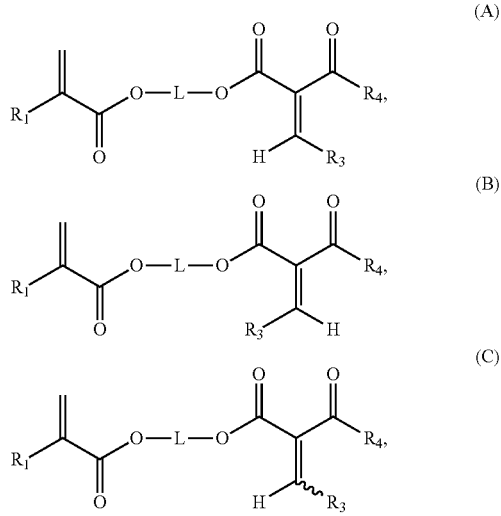

and
combinations thereof; and wherein R1, R3 and R4 are each given their broadest definition (see Summary of Invention).

For structures A-C, in one embodiment, L (or -L-) is selected from a saturated hydrocarbon, a substituted saturated hydrocarbon, an unsaturated hydrocarbon, or a substituted unsaturated hydrocarbon. In one embodiment, L is selected from a saturated hydrocarbon or a substituted saturated hydrocarbon. In one embodiment, L is selected from the group consisting of the following: a) —($CH_2$)$_n$—, where n≥2; b) —($CH_2CH_2O$)$_n$—$CH_2CH_2$—, where n≥1; c) —($CH_2CH(CH_3)O$)$_n$—$CH_2CH(CH_3)$—, where n≥1; d) —($CH_2CH(CH_2CH_3)O$)$_n$—$CH_2CH(CH_2CH_3)$—, where n≥1; e) —$CH_2$—$CH(OH)$—$CH_2$—; f) —$CH(CH_3)$—$CH_2$—; g) —$CH_2$—$CH(CH_3)$—; h) a combination of —$CH(CH_3)$—$CH_2$— and —$CH_2$—$CH(CH_3)$—; i) —$CH(CH_2CH_3)$—$CH_2$—; j) —$CH_2$—$CH(CH_2CH_3)$—; and k) a combination of —$CH(CH_2CH_3)$—$CH_2$— and —$CH_2$—$CH(CH_2CH_3)$—. In a further embodiment, L (or -L-) is selected from the group consisting of the following: a) —($CH_2$)$_n$—, where n≥2; b) —($CH_2CH_2O$)$_n$—$CH_2CH_2$—, where n≥1; c) —($CH_2CH(CH_3)O$)$_n$—$CH_2CH(CH_3)$—, where n≥1; d) —($CH_2CH(CH_2CH_3)O$)$_n$—$CH_2CH(CH_2CH_3)$—, where n≥1; and e) —$CH_2$—$CH(OH)$—$CH_2$—. In another embodiment, L is an alkylene comprising at least two carbon atoms. In a further embodiment, L (or -L-) is selected from —$CH_2CH_2$—, —$CH_2CH_2CH_2$—, —$CH(CH_3)$—$CH_2$—, —$CH_2$—$CH(CH_3)$—, —$CH_2CH_2CH_2CH_2$—, —$CH_2$—$C(CH_3)_2$—$CH_2$—.

For structures A-C, in one embodiment, R1 is selected from hydrogen, a saturated hydrocarbon, or a substituted saturated hydrocarbon.

For structures A-C, in one embodiment, R1 is selected from a saturated hydrocarbon or a substituted saturated hydrocarbon.

For structures A-C, in one embodiment, R1 is selected from hydrogen, or a substituted saturated hydrocarbon.

For structures A-C, in one embodiment, R1 is selected from hydrogen, or a saturated hydrocarbon.

For structures A-C, in one embodiment, R1 is selected from hydrogen, or an alkyl group.

For structures A-C, in one embodiment, R1 is hydrogen.

For structures A-C, in one embodiment, R1 is an alkyl. In a further embodiment, R1 is selected from methyl, ethyl, propyl, butyl, pentyl, hexyl, or cyclohexyl, and further methyl, ethyl, or propyl.

For structures A-C, in one embodiment, R1 (or —R1) is selected from the following: H or —($C_nH_{2n+1}$), where n≥1. In a further embodiment, n is from 1 to 20, further n is from 1 to 10, further n is from 1 to 6, and further n is from 1 to 3.

For structures A-C, in one embodiment, R1 (or —R1) is selected from the group consisting of the following: —($C_nH_{2n+1}$), where n≥1. In a further embodiment, n is from 1 to 20, further n is from 1 to 10, further n is from 1 to 6, and further n is from 1 to 3.

For structures A-C, in one embodiment, R3 is selected from hydrogen, a saturated hydrocarbon or a substituted saturated hydrocarbon.

For structures A-C, in one embodiment, R3 is selected from a saturated hydrocarbon or a substituted saturated hydrocarbon.

For structures A-C, in one embodiment, R3 is selected from hydrogen or a substituted saturated hydrocarbon.

For structures A-C, in one embodiment, R3 is selected from hydrogen or a saturated hydrocarbon.

For structures A-C, in one embodiment, R3 is selected from hydrogen or an alkyl.

For structures A-C, in one embodiment, R3 is hydrogen.

For structures A-C, in one embodiment, R3 is an alkyl. In a further embodiment, R3 is selected from methyl, ethyl, propyl, butyl, pentyl, hexyl, or cyclohexyl, and further methyl, ethyl, or propyl.

For structures A-C, in one embodiment, R3 (or —R3) is selected from the following: H or —($C_nH_{2n+1}$), where n≥1. In a further embodiment, n is from 1 to 20, further n is from 1 to 10, further n is from 1 to 6, and further n is from 1 to 3.

For structures A-C, in one embodiment, R3 (or —R3) is selected from the following: —($C_nH_{2n+1}$), where n≥1. In a further embodiment, n is from 1 to 20, further n is from 1 to 10, further n is from 1 to 6, and further n is from 1 to 3.

For structures A-C, in one embodiment, R4 is selected from a saturated hydrocarbon or a substituted saturated hydrocarbon.

For structures A-C, in one embodiment, R4 is selected from a substituted saturated hydrocarbon.

For structures A-C, in one embodiment, R4 is selected from a saturated hydrocarbon.

For structures A-C, in one embodiment, R4 is an alkyl. In a further embodiment, R4 is selected from methyl, ethyl, propyl, butyl, pentyl, hexyl, or cyclohexyl, and further methyl, ethyl, or propyl.

For structures A-C, in one embodiment, R4 (or —R4) is selected from the group consisting of the following: —($C_nH_{2n+1}$), where n≥1. In a further embodiment, n is from 1 to 20, further n is from 1 to 10, further n is from 1 to 6, and further n is from 1 to 3.

In one embodiment, the monomeric chain transfer agent is selected from Structure 2 below:

$$\text{(Structure 2)}$$

wherein R1, R2, R3 and R4 are each given their broadest definition (see Summary of Invention).

For Structure 2, in one embodiment, R1 is selected from hydrogen, a saturated hydrocarbon, or a substituted saturated hydrocarbon.

For Structure 2, in one embodiment, R1 is selected from a saturated hydrocarbon or a substituted saturated hydrocarbon.

For Structure 2, in one embodiment, R1 is selected from hydrogen, or a substituted saturated hydrocarbon.

For Structure 2, in one embodiment, R1 is selected from hydrogen, or a saturated hydrocarbon.

For Structure 2, in one embodiment, R1 is selected from hydrogen, or an alkyl group.

For Structure 2, in one embodiment, R1 is hydrogen.

For Structure 2, in one embodiment, R1 is an alkyl. In a further embodiment, R1 is selected from methyl, ethyl, propyl, butyl, pentyl, hexyl, or cyclohexyl, and further methyl, ethyl, or propyl.

For Structure 2, in one embodiment, R1 (or —R1) is selected from the following: H or —($C_nH_{2n+1}$), where n≥1. In a further embodiment, n is from 1 to 20, further n is from 1 to 10, further n is from 1 to 6, and further n is from 1 to 3.

For Structure 2, in one embodiment, R1 (or —R1) is selected from the group consisting of the following: —($C_nH_{2n+1}$), where n≥1. In a further embodiment, n is from 1 to 20, further n is from 1 to 10, further n is from 1 to 6, and further n is from 1 to 3.

For Structure 2, in one embodiment, R2 is selected from hydrogen, a saturated hydrocarbon or a substituted saturated hydrocarbon.

For Structure 2, in one embodiment, R2 is selected from a saturated hydrocarbon or a substituted saturated hydrocarbon.

For Structure 2, in one embodiment, R2 is selected from hydrogen or a substituted saturated hydrocarbon.

For Structure 2, in one embodiment, R2 is selected from hydrogen or a saturated hydrocarbon.

For Structure 2, in one embodiment, R2 is selected from hydrogen or an alkyl.

For Structure 2, in one embodiment, R2 is hydrogen.

For Structure 2, in one embodiment, R2 is an alkyl. In a further embodiment, R2 is selected from methyl, ethyl, propyl, butyl, pentyl, hexyl, or cyclohexyl, and further methyl, ethyl, or propyl.

For Structure 2, in one embodiment, R2 (or —R2) is selected from the following: H or —($C_nH_{2n+1}$), where n≥1. In a further embodiment, n is from 1 to 20, further n is from 1 to 10, further n is from 1 to 6, and further n is from 1 to 3.

For Structure 2, in one embodiment, R2 (or —R2) is selected from the following: —($C_nH_{2n+1}$), where n≥1. In a further embodiment, n is from 1 to 20, further n is from 1 to 10, further n is from 1 to 6, and further n is from 1 to 3.

For Structure 2, in one embodiment, R3 is selected from hydrogen, a saturated hydrocarbon or a substituted saturated hydrocarbon.

For Structure 2, in one embodiment, R3 is selected from a saturated hydrocarbon or a substituted saturated hydrocarbon.

For Structure 2, in one embodiment, R3 is selected from hydrogen or a substituted saturated hydrocarbon.

For Structure 2, in one embodiment, R3 is selected from hydrogen or a saturated hydrocarbon.

For Structure 2, in one embodiment, R3 is selected from hydrogen or an alkyl.

For Structure 2, in one embodiment, R3 is hydrogen.

For Structure 2, in one embodiment, R3 is an alkyl. In a further embodiment, R3 is selected from methyl, ethyl, propyl, butyl, pentyl, hexyl, or cyclohexyl, and further methyl, ethyl, or propyl.

For Structure 2, in one embodiment, R3 (or —R3) is selected from the following: H or —($C_nH_{2n+1}$), where n≥1. In a further embodiment, n is from 1 to 20, further n is from 1 to 10, further n is from 1 to 6, and further n is from 1 to 3.

For Structure 2, in one embodiment, R3 (or —R3) is selected from the following: —($C_nH_{2n+1}$), where n≥1. In a further embodiment, n is from 1 to 20, further n is from 1 to 10, further n is from 1 to 6, and further n is from 1 to 3.

For Structure 2, in one embodiment, R4 is selected from a saturated hydrocarbon or a substituted saturated hydrocarbon.

For Structure 2, in one embodiment, R4 is selected from a substituted saturated hydrocarbon.

For Structure 2, in one embodiment, R4 is selected from a saturated hydrocarbon.

For Structure 2, in one embodiment, R4 is an alkyl. In a further embodiment, R4 is selected from methyl, ethyl, propyl, butyl, pentyl, hexyl, or cyclohexyl, and further methyl, ethyl, or propyl.

For Structure 2, in one embodiment, R4 (or —R4) is selected from the group consisting of the following: —($C_nH_{2n+1}$), where n≥1. In a further embodiment, n is from 1 to 20, further n is from 1 to 10, further n is from 1 to 6, and further n is from 1 to 3.

For Structure 2, in one embodiment, R2 and R3 form a ring structure. In a further embodiment, R2 and R3 form a C5-C8 ring. In a further embodiment, R2 and R3 form a C5-C6 ring structure.

For Structure 2, in one embodiment, R2, R3 and R4 form a ring structure. In a further embodiment, R2 and R3 form a C8-C10 ring.

In one embodiment, the monomeric chain transfer agent is selected from the group consisting of the following:

(a)

(b)

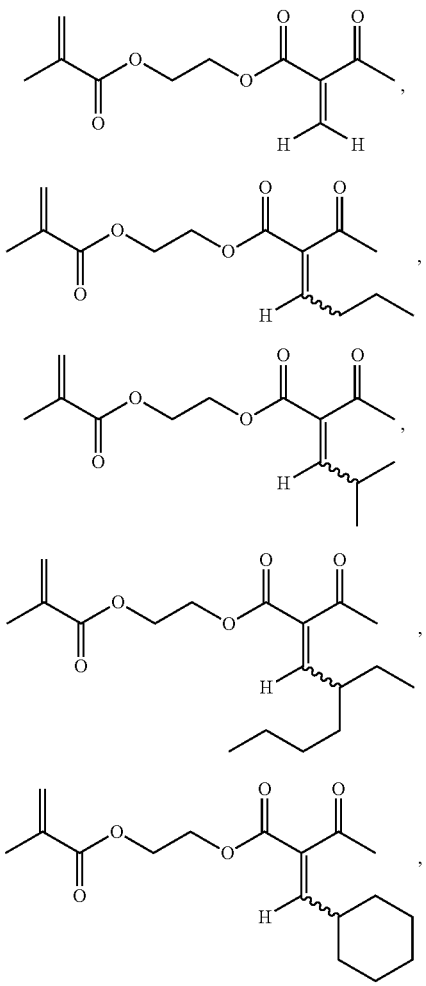

and combinations thereof.

As discussed above, the notation "∿∿" represents a mixture of the (E) and (Z) isomers. For example, see March, J., *Advanced Organic Chemistry*, 3rd Ed., John Wiley & Sons, Inc., 1985, pp. 109-110.

In one embodiment, an inventive polymer is polymerized in the presence of at least two monomeric chain transfer agents as disclosed herein.

A monomeric CTA may comprise a combination of two or more embodiments as described herein.

The monomeric chain transfer agent of Structure 1 may comprise a combination of two or more embodiments as described herein.

The monomeric chain transfer agent of any of Structures A through C may comprise a combination of two or more embodiments as described herein.

The monomeric chain transfer agent of Structure 2 may comprise a combination of two or more embodiments as described herein.

Initiators

The inventive ethylene-based polymers can be prepared by a free radical polymerization process. The type of free radical initiator to be used in the present process is not critical, and specific initiators will be selected based on the required temperature operating window. Free radical initiators that are generally used include organic peroxides, such as peresters, perketals, peroxy ketones, percarbonates and cyclic multifunctional peroxides.

Exemplary organic peroxides include, but are not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. Other suitable initiators include azodicarboxylic esters, azodicarboxylic dinitriles and 1,1,2,2-tetramethylethane derivatives, and other components capable of forming free radicals in the desired operating temperature range.

These organic peroxy initiators are used in conventional amounts, typically from 0.001 to 0.2 weight percent, further from 0.005 to 0.2 weight percent, based on the weight of polymerizable monomers. Peroxides are typically injected as diluted solutions in a suitable solvent, for example, in a hydrocarbon solvent. In one embodiment, these organic peroxy initiators are used in an amount from 0.001 to 0.2 weight percent, based upon the weight of polymerizable monomers.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168 (now available from BASF). In general, the polymers are treated with one or more stabilizers before extrusion or other melt processes.

Blends and mixtures of the inventive polymer with other polymers may be performed. Suitable polymers for blending with the inventive polymer include natural and synthetic polymers. Exemplary polymers for blending include propylene-based polymers, (for example, impact modifying polypropylene, isotactic polypropylene, atactic polypropylene, and random propylene/ethylene copolymers); various types of ethylene-based polymers, including high pressure, free-radical LDPE, Ziegler-Natta LLDPE, "single-site catalyzed" PE, including multiple reactor PE ("in reactor" blends of Ziegler-Natta PE and "single-site catalyzed" PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers; polystyrene; impact modified polystyrene; ABS; styrene/butadiene block copolymers and hydrogenated derivatives thereof (SBS and SEBS); and thermoplastic polyurethanes.

Applications

The polymers of this invention may be employed in a variety of conventional thermoplastic fabrication processes to produce useful articles, including monolayer and multilayer films; molded articles, such as blow molded, injection molded, or rotomolded articles; coatings; fibers; and woven or non-woven fabrics.

An inventive polymer may be used in extrusion coatings and in a variety of films, including, but not limited to, clarity shrink films, collation shrink films, cast stretch films, silage films, stretch hood, sealants, and diaper backsheets.

Other suitable applications include, but are not limited to, wires and cables, gaskets and profiles, adhesives; footwear components, and auto interior parts.

DEFINITIONS

The term "hydrocarbon," as used herein, refers to a chemical compound or substituent containing only carbon and hydrogen atoms.

The term "substituted hydrocarbon," as used herein, refers to a hydrocarbon comprising at least one heteroatom (for example, oxygen (O) or nitrogen (N)).

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, may comprise at least one comonomer.

The term "ethylene-based interpolymer" refers to an interpolymer that comprises a majority amount of polymerized ethylene based on the weight of the interpolymer, and comprises at least one comonomer.

The term "ethylene/α-olefin interpolymer" refers to an interpolymer that comprises a majority amount of polymerized ethylene based on the weight of the interpolymer, and comprises an α-olefin.

The term "propylene-based polymer" refers to a polymer that comprises a majority amount of polymerized propylene, based on the weight of the polymer, and, optionally, may comprise at least one comonomer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density

Samples that were measured for density were prepared according to ASTM D 1928. Samples were pressed at 374° F. (190° C.) and 30,000 psi for three minutes, and then at 70° F. (21° C.) and 30,000 psi for one minute. Density measurements were made within one hour of sample pressing, using ASTM D792, Method B.

Melt Index

Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes.

Melt Strength

Melt strength was measured at 190° C. using a Göettfert Rheotens 71.97 (Göettfert Inc.; Rock Hill, S.C.). The melted sample (about 25 to 50 grams) was fed with a Göettfert Rheotester 2000 capillary rheometer, equipped with a flat entrance angle (180 degrees) of length of 30 mm and diameter of 2 mm. The sample was fed into the barrel (L=300 mm, Diameter=12 mm), compressed and allowed to melt for 10 minutes, before being extruded at a constant piston speed of 0.265 mm/s, which corresponds to a wall shear rate of $38.2\,s^{-1}$ at the given die diameter. The extrudate passed through the wheels of the Rheotens, located at 100 mm below the die exit, and was pulled by the wheels downward, at an acceleration rate of $2.4\,mm/s^2$. The force (in cN) exerted on the wheels was recorded as a function of the velocity of the wheels (in mm/s. Samples were repeated at least twice, until two curves of the force (in cN) as a function of strand velocity (in mm/s) superimpose, then the curve that had the highest velocity at the strand break was reported. Melt strength was reported as the plateau force (cN) before the strand broke.

EXPERIMENTAL

Monomeric CTA Synthesis
(2-(methacryloyloxy)ethyl 2-acetylpent-2-enoate mixture)

To a magnetically stirred, 1000 mL, round bottom flask were added 200 mL of propionaldehyde and 587 mL 2-(methacryloyloxy)ethyl 3-oxobutanoate. The reaction mixture was cooled to 0° C., in an ice bath, and then 3 to 5 mL of piperidine was added dropwise over one minute. The mixture was stirred at 0° C., for 2 hours, and then allowed to warm to room temperature over the course of 2-2.5 hours. To the reaction mixture was slowly added 30 mL of 3N HCl, over about one minute, to neutralize the piperdine. The mixture was poured into a separatory funnel, and then 150 mL of deionized water was added. The mixture was shaken, and then the aqueous layer was separated and disposed of. The reaction mixture was washed three more times with 150 mL of deionized water, each time, and then dried over $MgSO_4$. The reaction mixture was filtered, and then stabilized with 10 mass ppm of 4-hydroxy-TEMPO. The dried reaction mixture was used without further purification.

Inventive Ethylene-Based Polymers A-1 and A-2 and Control A-0

Monomeric CTA Solution—

Undiluted 2-(methacryloyloxy)ethyl 2-acetylpent-2-enoate mixture (hereafter methacrylate mCTA) was loaded into a stainless steel supply vessel, and diluted with ethyl acetate, to produce a final concentration of 3 wt %, based on the weight of the solution. This vessel was kept under a nitrogen pad.

Initiator Mixture—

Peroxide initiators tert-butyl peroxyacetate (50.4 gm of a 20% by weight solution in ISOPAR™ H) and di-tert-butyl peroxide (14.21 gm of a 20% by weight solution in ISO-PAR™ H) were mixed with 4.46 kg of ISOPAR E in a stainless steel supply vessel. The vessel was kept under nitrogen pad.

Control (A-0)—

Ethylene was injected at 5500 gm/hr (197 moles/hr), at a pressure of 1930 bar, into an agitated (1600 rpm), 300 mL high pressure CSTR (Continuously Stirred Tank Reactor) reactor. Propylene (CTA) was added to the ethylene stream, at a pressure of 62 bar, and at a rate of 107 gm/hr (2.54 mole/hr), before the mixture was compressed to 1930 bar, and injected into the reactor. The peroxide initiator mixture was added directly to the reactor through the sidewall of the CSTR reactor, and at a pressure of 1930 bar, and at a rate of $7.2 \times 10^{-2}$ gm/hr. The ethylene conversion to polymer was 12.4 wt %, based on the mass of ethylene entering the reactor, and the average reaction temperature was 223° C. An ethylene-based polymer with a melt index (2) of 4.25 g/10 min was formed. Approximately 600 grams of this ethylene-based polymer (A-0) was collected. Reaction polymerization conditions are summarized below in Table 1. Properties of the polymers are shown in Table 2 below.

Inventive Ethylene-Based Polymers A-1

Propylene (CTA) was added to the ethylene stream at a pressure of 62 bar, and at a rate of 163 gm/hr (3.87 mole/hr), before the mixture was compressed to 1930 bar, and injected into the reactor (see A-0 above). The solution of methacrylate mCTA in ethyl acetate (see above) was pumped at a pressure of 1930 bar, and at a rate of 82.3 gm/hr (9.7 millimoles/hr) into the ethylene-propylene mixture, before said mixture was injected into the reactor. The peroxide initiator mixture was added directly to the reactor, through the sidewall, at a pressure of 1930 bar, and at a rate of $8.8 \times 10^{-2}$ gm/hr. The ethylene conversion to polymer was 11.9 wt %, based on the mass of ethylene entering the reactor, and the average reaction temperature was 218° C. An ethylene-based polymer with a melt index (2) of 4.27 g/10 min was formed. Approximately 950 grams of this ethylene-based polymer (A-1) was collected. Reaction polymerization conditions are summarized below in Table 1. Properties of the polymers are shown in Table 2 below.

Inventive Ethylene-Based Polymers A-2

Propylene (CTA) was added to the ethylene stream at a pressure of 62 bar, and at a rate of 175 gm/hr (4.16 mole/hr), before the mixture was compressed to 1931 bar, and injected into the reactor (see A-0 above). The solution of methacrylate mCTA in ethyl acetate (see above) was pumped at a pressure of 1931 bar, and at a rate of 165 gm/hr (19.5 millimoles/hr) into the ethylene-propylene mixture, before said mixture was injected into the reactor. The peroxide initiator mixture was added directly to the reactor, through the sidewall, at a pressure of 1930 bar, and at a rate of $7.5 \times 10^{-2}$ gm/hr. The ethylene conversion to polymer was 10.1 wt %, based on the mass of ethylene entering the reactor, and the average reaction temperature was 217° C. An ethylene-based polymer with a melt index (2) of 4.23 g/10 min was formed. Approximately 770 grams of this ethylene-based polymer (A-2) was collected. Reaction polymerization conditions are summarized below in Table 1. Properties of the polymers are shown in Table 2 below.

As seen in Table 2, it was discovered that inventive ethylene-based polymers (A-1, A-2) have significantly higher melt strength (at similar melt indexes) than the comparative polymer (A-0). Higher melt strength will improve the polymers processability for extrusion coatings and film fabrications.

TABLE 1

Polymerization Conditions

|  | Ethylene (gm/hr) | Propylene (gm/hr) | t-butyl peroxy-acetate (gm/hr) | di-t-butyl peroxide (gm/hr) | 3 wt. % Methacrylate mCTA in Ethyl Acetate (gm/hr) | Reaction Temperature (° C.) | Ethylene Conversion (wt. %) | Ethylene-Based Polymer Collected (gm) |
|---|---|---|---|---|---|---|---|---|
| A-0 | 5500 | 107 | 0.056 | 0.016 | 0 | 223° C. | 12.4 | 600 |
| A-1 | 5460 | 163 | 0.069 | 0.019 | 82.3 | 218° C. | 11.9 | 950 |
| A-2 | 5480 | 175 | 0.059 | 0.016 | 165 | 217° C. | 10.1 | 770 |

TABLE 2

Polymer Properties*

|  | Melt Index (I2) (g/10 min) | Melt Strength (cN) |
|---|---|---|
| A-0 | 4.25 | 5.5 |
| A-1 | 4.27 | 7.6 |
| A-2 | 4.23 | 8.8 |

*Densities of the polymers range from 0.910 to 0.940 g/cc.

The invention claimed is:

1. An ethylene-based polymer formed from at least the following: ethylene and a monomeric chain transfer agent (monomeric CTA) selected from Structure 1:

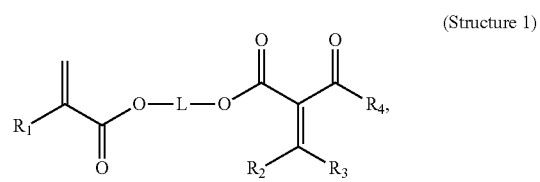

(Structure 1)

wherein

L is selected from a saturated hydrocarbon, a substituted saturated hydrocarbon, an unsaturated hydrocarbon, or a substituted unsaturated hydrocarbon;

R1 is selected from hydrogen, a saturated hydrocarbon, a substituted saturated hydrocarbon, an unsaturated hydrocarbon, or a substituted unsaturated hydrocarbon;

R2 is selected from hydrogen, a saturated hydrocarbon or a substituted saturated hydrocarbon;

R3 is selected from hydrogen, a saturated hydrocarbon or a substituted saturated hydrocarbon; and R4 is selected from a saturated hydrocarbon, a substituted saturated hydrocarbon, an unsaturated hydrocarbon, or a substituted unsaturated hydrocarbon.

2. The ethylene-based polymer of claim 1, wherein L is selected from a saturated hydrocarbon or a substituted saturated hydrocarbon.

3. The ethylene-based polymer of claim 1, wherein L is selected from the group consisting of the following:
   a) —$(CH_2)_n$—, where n≥2;
   b) —$(CH_2CH_2O)_n$—$CH_2CH_2$—, where n≥1;
   c) —$(CH_2CH(CH_3)O)_n$—$CH_2CH(CH_3)$—, where n≥1;
   d) —$(CH_2CH(CH_2CH_3)O)_n$—$CH_2CH(CH_2CH_3)$—, where n≥1; and
   e) —$CH_2$—CH(OH)—$CH_2$—;
   f) —CH($CH_3$)—$CH_2$—;
   g) —$CH_2$—CH($CH_3$)—;
   h) a combination of —CH($CH_3$)—$CH_2$— and —$CH_2$—CH($CH_3$)—;
   i) —CH($CH_2CH_3$)—$CH_2$—;
   j) —$CH_2$—CH($CH_2CH_3$)—; and
   k) a combination of —CH($CH_2CH_3$)—$CH_2$— and —$CH_2$—CH($CH_2CH_3$)—.

4. The ethylene-based polymer of claim 1, wherein L is an alkylene.

5. The ethylene-based polymer of claim 1, wherein R1 is hydrogen or an alkyl group.

6. The ethylene-based polymer of claim 1, wherein R2 is hydrogen or an alkyl group.

7. The ethylene-based polymer of claim 1, wherein R2 is selected from $C_nH_{2n+1}$, where n≥1.

8. The ethylene-based polymer of claim 1, wherein R3 is hydrogen or an alkyl group.

9. The ethylene-based polymer of claim 1, wherein R3 is selected from $C_nH_{2n+1}$, where n≥1.

10. The ethylene-based polymer of claim 1, wherein R4 is an alkyl group.

11. A composition comprising the ethylene-based polymer of claim 1.

12. An article comprising at least one component formed from the composition of claim 11.

13. A process to prepare the ethylene-based polymer of claim 1, said process comprising polymerizing ethylene in the presence of the monomeric chain transfer agent of Structure 1.

14. The process of claim 13, wherein the polymerization takes place in at least one tubular reactor.

15. The process of claim 13, wherein the polymerization takes place at at least one pressure from 150 MPa to 350 MPa, and at at least one temperature from 100° C. to 380° C.

* * * * *